United States Patent [19]

Matsubayashi et al.

[11] Patent Number: 5,107,952
[45] Date of Patent: Apr. 28, 1992

[54] SADDLE TYPE OFF-ROAD VEHICLE

[75] Inventors: Shinji Matsubayashi; Kohsuke Asao, both of Tokyo; Shoukichi Arai, Saitama, all of Japan

[73] Assignee: Honda Giken Kogyo Kabushiki Kaisha, Tokyo, Japan

[21] Appl. No.: 569,238

[22] Filed: Aug. 17, 1990

Related U.S. Application Data

[63] Continuation of Ser. No. 336,828, Apr. 12, 1989, abandoned.

[51] Int. Cl.$^5$ ............................................. B62K 25/04
[52] U.S. Cl. ...................................... 180/349; 180/215; 296/371
[58] Field of Search ................. 180/210, 21, 211, 215, 180/219, 252, 233, 349, 370, 378; 296/37.16, 37.1

[56] References Cited

U.S. PATENT DOCUMENTS

| | | | |
|---|---|---|---|
| 4,325,562 | 4/1982 | Yamada et al. | 280/62 |
| 4,449,602 | 5/1964 | Dittman, Jr. | 180/215 |
| 4,646,865 | 3/1987 | Imaizumi et al. | 180/73.1 |
| 4,650,210 | 3/1987 | Hirose et al. | 180/215 |
| 4,735,275 | 4/1988 | Tsukahara | 180/215 |
| 4,800,980 | 1/1989 | Hideo et al. | 180/225 |

FOREIGN PATENT DOCUMENTS 59-128016  7/1984  Japan.

Primary Examiner—Andres Kashnikow
Assistant Examiner—Richard Camby
Attorney, Agent, or Firm—Irving M. Weiner; Joseph P. Carrier; Pamela S. Burt

[57] ABSTRACT

A saddle type, off-road vehicle comprises a frame, including upper, lower and rear portions, an engine supported by the frame, a pair of rear wheels disposed on opposite sides of the main frame. The lower portion of the frame extends rearwardly and upwardly behind the engine and the rear portion of the frame extends substantially horizontally therefrom, while the upper portion of the frame extending rearwardly downwardly behind the seat terminates in the vicinity of a junction between the lower and rear portions of the frame.

10 Claims, 6 Drawing Sheets

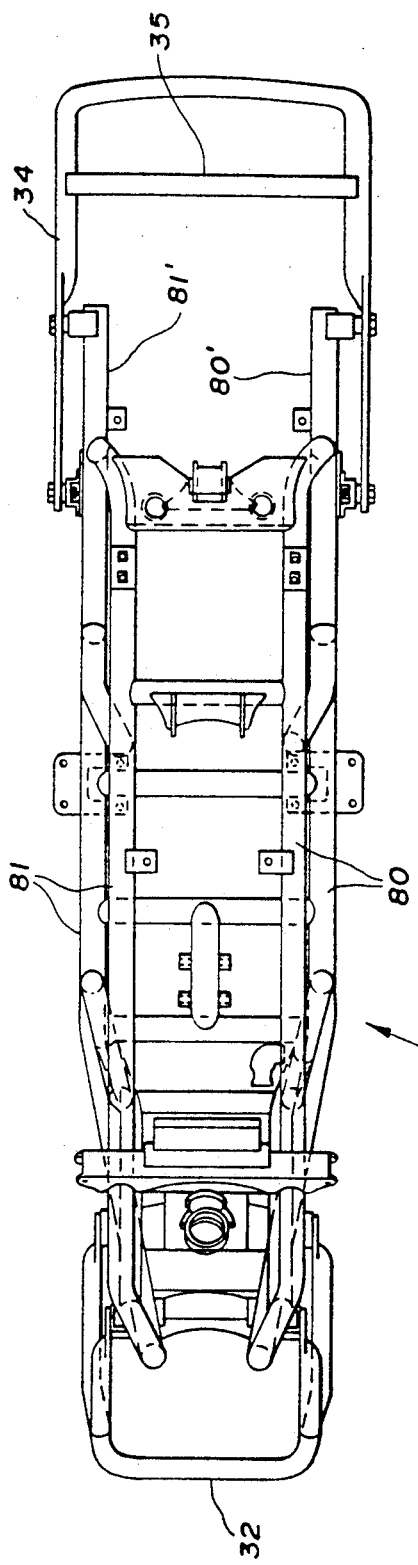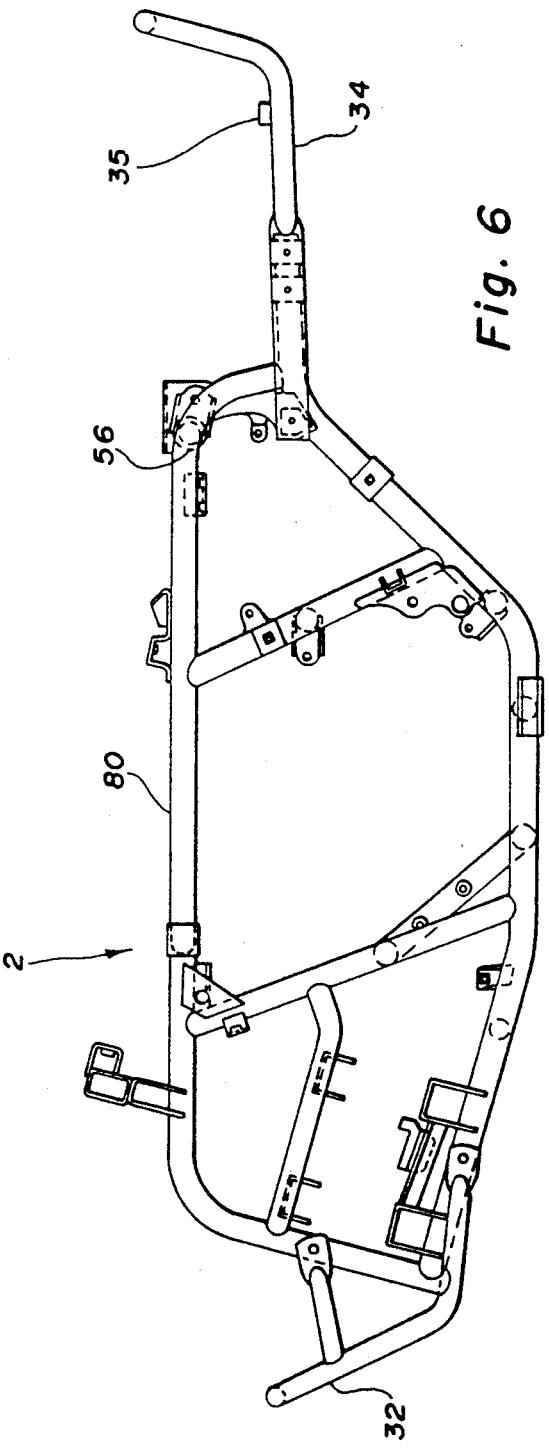

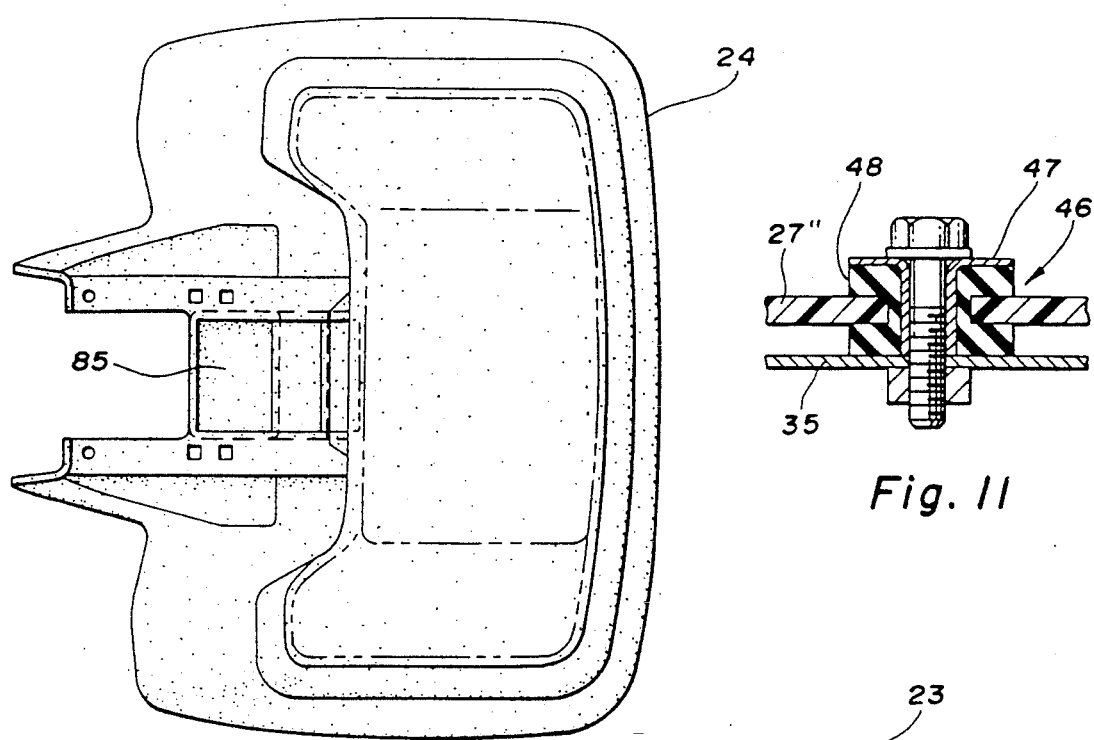
Fig. 8
Fig. 11
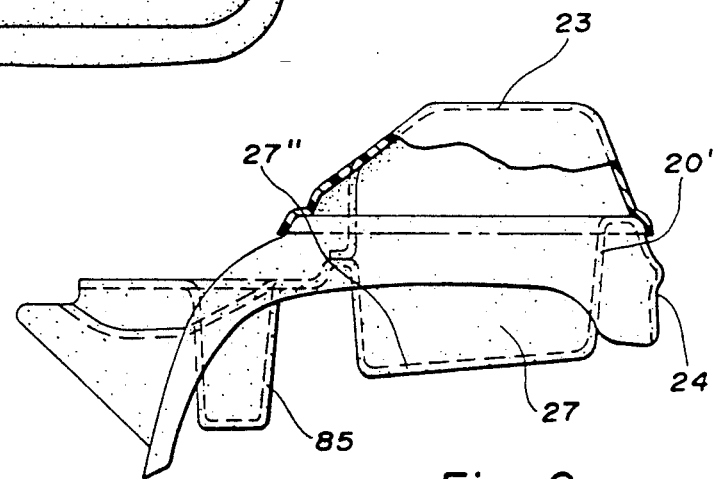
Fig. 9
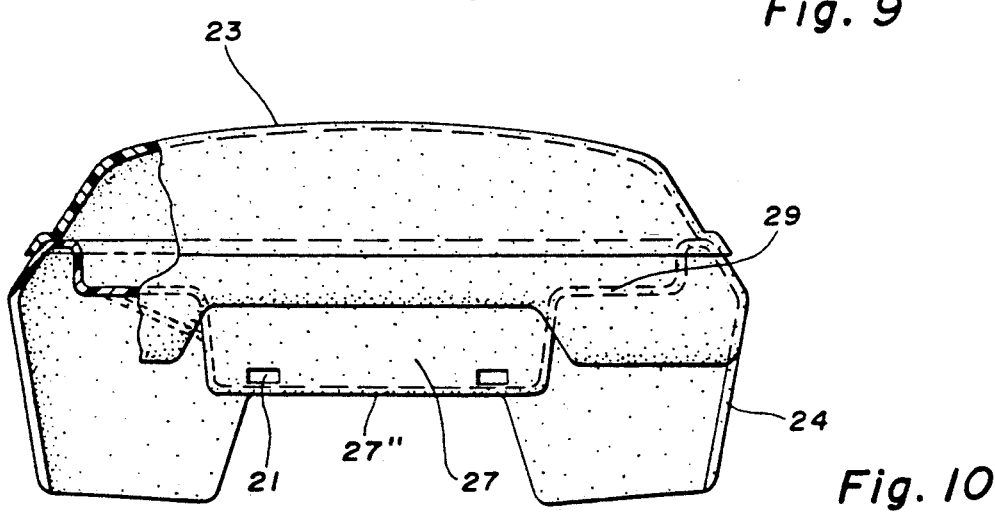
Fig. 10

SADDLE TYPE OFF-ROAD VEHICLE

This is a continuation of application Ser. No. 07/336,828 filed Apr. 12, 1989 now abandoned.

BACKGROUND OF THE INVENTION

1. Field of the Invention

The present invention relates to a saddle type, off-road vehicle having a storage receptacle and a novel frame structure. More particularly, the present invention relates to a saddle type, off-road vehicle having a saddle type seat similar to a motorcycle, a pair of front wheels and a pair of rear wheels each provided with a balloon type, ultra low-pressure tire, a relatively large storage receptacle provided on a rear portion of the vehicle and a novel frame structure well suited for demanding, work-related activities.

2. Description of the Relevant Art

There are many known saddle type, off-road vehicles, including many three and four wheeled vehicles. These known vehicles are normally equipped with balloon type, ultra low-pressure tires for traveling through and over many different terrains. Further, these vehicles have been used for recreational as well as farming activities because of their great ability to travel over many different terrains.

One known saddle type, four wheeled vehicle is disclosed in U.S. Pat. No. 4,646,865. The frame of this known vehicle includes many members so that the vehicle has a strong structure suitable for performing the above discussed activities. Such known frame structure is, however, rather complex to assemble through welding and the like because it includes many members, and substantially increases the vehicle's overall weight.

The present invention has been developed to overcome the above-discussed problems and disadvantages of known saddle type, off-road vehicles.

SUMMARY OF THE INVENTION

It is an object of the present invention to provide a saddle type, off-road vehicle which can be easily constructed and is lightweight.

It is another object of the present invention to provide such an off-road vehicle having a relatively large storage receptacle provided at a rear portion thereof for conveniently storing and transporting relatively large and heavy loads.

It is yet another object of the present invention to provide such an off-road vehicle having an improved frame structure which is well suited for supporting large and/or heavy loads and for other demanding work related activities.

Still another object of the present invention is to provide such an off-road vehicle in which the components thereof are very efficiently arranged so that the size of the off-road vehicle is comparable to other off-road vehicles which do not have a relatively large storage receptacle associated therewith.

According to the present invention a saddle type, off-road vehicle is provided which comprises a frame including upper and lower portions, an engine supported by the frame, a pair of rear wheels disposed on opposite sides of the frame, at least one front wheel, and a seat supported on an upper portion of the frame. A lower portion of the frame extends rearwardly and upwardly behind the engine, a rear portion of the frame extends rearwardly from the lower portion of the frame, and the upper portion of the frame extends rearwardly downwardly behind the seat and terminates in the vicinity of a junction between the lower and rear portions of the frame. Further, each of the upper and lower portions of the main frame comprises a pair of laterally spaced sections, and the vehicle may include a relatively large storage receptacle provided at a rear portion thereof.

The above and other objects, features and advantages of the present invention will become apparent from the following description when taken in conjunction with the accompanying drawings which illustrate a preferred embodiment by way of example.

BRIEF DESCRIPTION OF THE DRAWINGS

FIG. 5 is a plan view of a frame of the vehicle shown in FIG. 1.

FIG. 6 is a side view of the frame shown in FIG. 5.

FIG. 8 is a plan view of an integral rear fender and storage receptacle unit of the vehicle shown in FIGS. 1-4.

FIG. 9 is a side view and FIG. 10 is a rear view, respectively, of the integral rear fender and storage receptacle unit shown in FIG. 8, with portions of the unit broken away to show additional structural details thereof.

FIG. 11 is an enlarged sectional view of a connection between the storage receptacle and the vehicle's frame.

DETAILED DESCRIPTION OF THE PREFERRED EMBODIMENT

Figure 1:
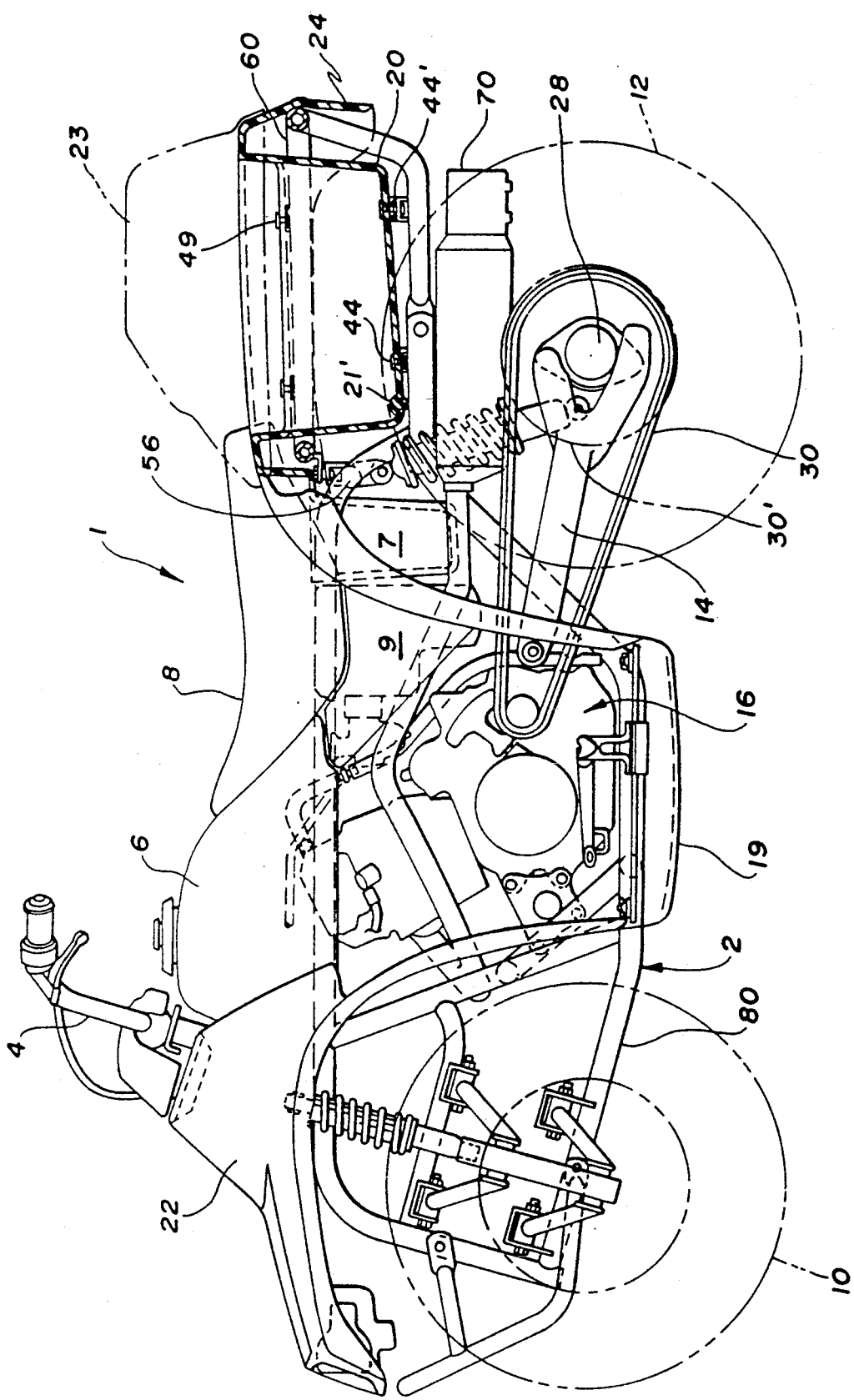
FIG. 1 is a side view of a saddle type, off-road vehicle according to the present invention.

Referring to FIGS. 1-4, there is shown a saddle type, off-road vehicle 1 according to the present invention. The vehicle includes a frame 2 (shown more particularly in FIGS. 5 and 6) which supports a steering handle 4, a fuel tank 6, a rider's seat 8, a pair of front wheels 10 (each provided with a balloon type, ultra low-pressure tire) which are steered through the steering handle 4, a rear swing arm assembly 14, a drive unit 16 including an internal combustion engine and a transmission means for transferring rotative power to a pair of rear wheels 12 (each of which is also provided with a balloon type, ultra low-pressure tire), a pair of foot supports 18, a battery 7, an air cleaner 9, a front fender 22, a rear fender 24, and a relatively large sized storage receptacle 20.

Note that the rear swing arm assembly 14 vertically swingably supports a rear axle 28, which in turn supports the rear wheels 12. As shown in FIG. 1, the rear axle 28 is supported on a rear end of the swing arm assembly 14 so that it can be readily adjusted in the longitudinal direction of the vehicle, and is rotatably driven by a transmission means of the drive unit 16 which is depicted as including a drive chain 30 and a sprocket 30' fixed to the rear axle 28. It will be understood that although a sprocket and chain type transmission means is disclosed in FIGS. 1-4, other known types of transmission means, such as drive shaft type, could be used in vehicles according to the present invention. Also, it will be understood that a vehicle according to the present invention could have driven front wheels as well as driven rear wheels.

Referring to FIGS. 1 and 3-6 the frame 2 is comprised of a pair of longitudinally extending, laterally spaced sections 80, 81 and a plurality of cross members which connect and reinforce the sections 80, 81. As best shown in FIGS. 1 and 6, the major part of each section 80, 81 is generally loop shaped when viewed from the side. Such a loop shape is preferred because it provides improved strength and rigidity. As also depicted, each of sections 80, 81 preferably includes a smaller rear part 80', 81', respectively, which extends integrally rearwardly from a lower portion of the major, loop shaped part, and which functions to support the storage receptacle 20.

Although the depicted construction of the frame 2 is preferred, it will be understood that a vehicle according to the present invention could include differently constructed frames. For example, the sections 80, 81 may not include rear projecting parts such as 80', 81', whereby the storage receptacle could be supported by upper or rear surfaces of the loop shaped parts. Further, the laterally spaced sections of the frame may not be loop shaped, but rather may be simply constructed as longitudinally extending members formed from cast aluminum or the like.

The vehicle 1 also preferably includes a front guard 32 extending forwardly and upwardly from a front, lower portion of the frame 2, and a rear guard 34 extending rearwardly and upwardly from the rear parts 80', 81' of the frame 2. As shown, a rear end of the rear guard 34 preferably extends upwardly and slightly rearwardly of a lower rear end of the storage receptacle 20, and the rear guard may include one or more cross members 35 connected laterally across intermediate portions thereof to provide added strength and rigidity. The front and rear guards 32, 34 may be connected to the frame 2 using appropriate fastening means, as shown, or may be formed integrally with the frame through welding or the like.

As discussed above, the major parts of the lateral sections 80, 81 of the frame 2 are generally loop shaped when viewed from the side. Particularly, a front, upper portion of each section 80, 81 is bent downwardly and a front, lower portion of each section is bent slightly upwardly such that the front upper and lower portions are joined together at an angle of substantially 90°. Further, a rear, lower portion or each section 80, 81 is bent rearwardly upwardly behind the engine and is again bent rearwardly where it extends integrally into the rear part 80' or 81', while a rear, upper portion of each section 80, 81 is bent rearwardly downwardly behind the seat 8 and terminates at the junction between the corresponding rear lower portion and rear part 80' or 81' such that the rear ends of the upper and lower portions define a substantially continuous curve when viewed from the side. This loop shaped construction of the frame 2 has a desirably high strength and rigidity.

Also, as best shown in FIG. 5, the upper portions of the sections 80, 81 of the frame 2 has a smaller lateral width therebetween than the lower portions of the sections, except at the front ends thereof. Thus, as shown, the rear upper portion of each section 80, 81 is also bent outwardly so that it squarely engages the junction between the corresponding lower portion and the rear part 80', or 81'. On the other hand, the front end lower portion of each section 80, 81 tapers inwardly in a progressive manner forwardly of the engine such that the lateral width between the front lower portions becomes slightly smaller than that between the front upper portions, and the downwardly bent front upper portions of the sections 80, 81 are also bent inwardly to squarely engage the front lower portions.

The vehicle 1 may optionally include a subframe 60 which would provide additional support for the storage receptacle 20. As depicted, the subframe 60 is preferably constructed as a substantially rectangularly shaped ring which includes a rear laterally extending member of the rear guard 34 at the rear end thereof, while a front end thereof is supported on a cross member 56 interconnecting the laterally spaced sections 80, 81 of the frame 2.

As shown in FIGS. 1-3 and 8-10, the rear fender 24 and the storage receptacle 20 are preferably constructed or formed as an integral unit. Such integral unit is preferably composed of synthetic materials such as moldable plastics, fiberglass, etc., but may be constructed of other conventional materials such as sheet metal. The integrally constructed rear fender and storage receptacle unit is advantageous for many reasons, including relatively low manufacturing cost, increased structural strength and rigidity, attractive appearance, etc. As depicted, the rear fender 24 preferably extends outwardly and downwardly around the full perimeter of the upper end of the storage receptacle 20 to ensure that the upper end of the storage receptacle is sufficiently strong and rigid.

The storage receptacle 20 preferably has a large opening defined in the upper surface thereof such that its upper end is substantially completely open. Such open construction permits objects to be readily placed into and taken out of the storage receptacle 20. Additionally, the vehicle 1 preferably includes a lid 23 which can be readily secured over and removed from the open upper end of the storage receptacle 20 by being simply placed thereon. If desired, the lid 23 may be pivotally attached to the storage receptacle 20 or the rear fender 24 through an appropriate hinge means, and a securing means including a latch mechanism and a lock may be provided for securing the lid 23 in a closed position over the storage receptacle.

As depicted, the storage receptacle 20 preferably includes a lower, central portion 27 and an upper, laterally extending portion 29 which extends laterally of the central portion 27 on both sides thereof. A stepwise structure is defined between the central and laterally extending portions. Similarly, there is a stepwise structure between the laterally extending portion 29 and the rear fender 24. Such stepwise structures may be sloped, such as shown by the ghost lines in FIG. 9 in relation to the stepwise structure between portions 27, 29.

Figure 7:
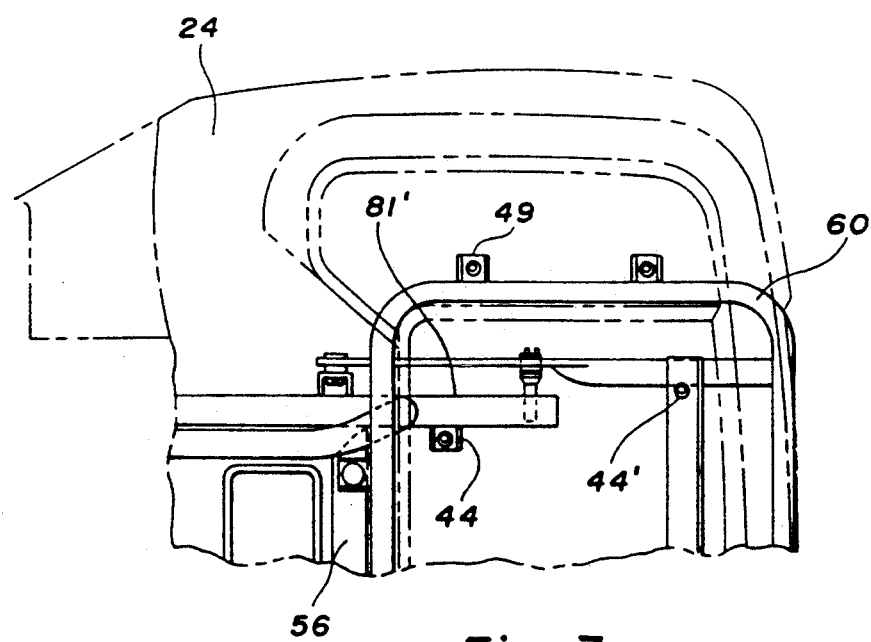
FIG. 7 is a plan view of a rear section of the vehicle shown in FIG. 1 which clearly shows the connections between the storage receptacle and the frame.
Figure 12:
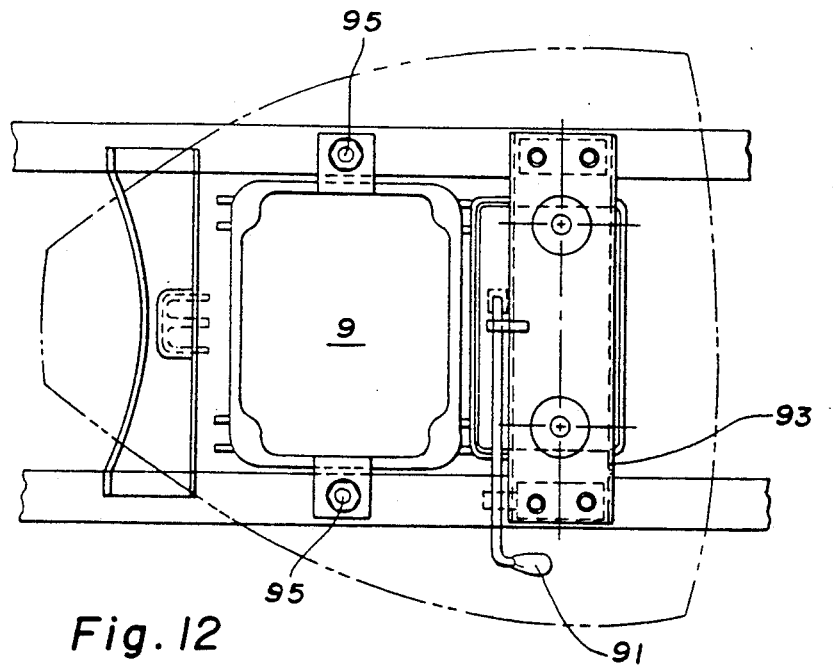
FIGS. 12-14 show an arrangement whereby the battery and air cleaner are supported by an upper portion of the frame beneath the rider's seat.
Figure 13:
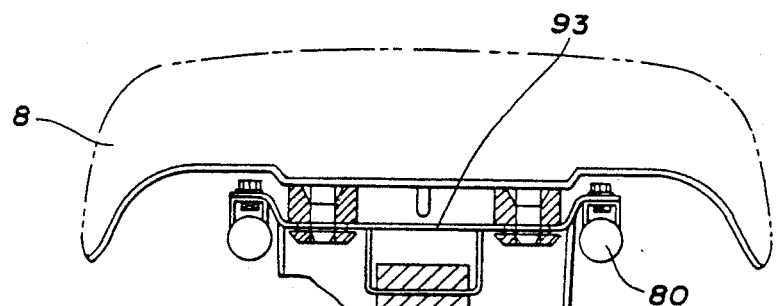
Figure 14:
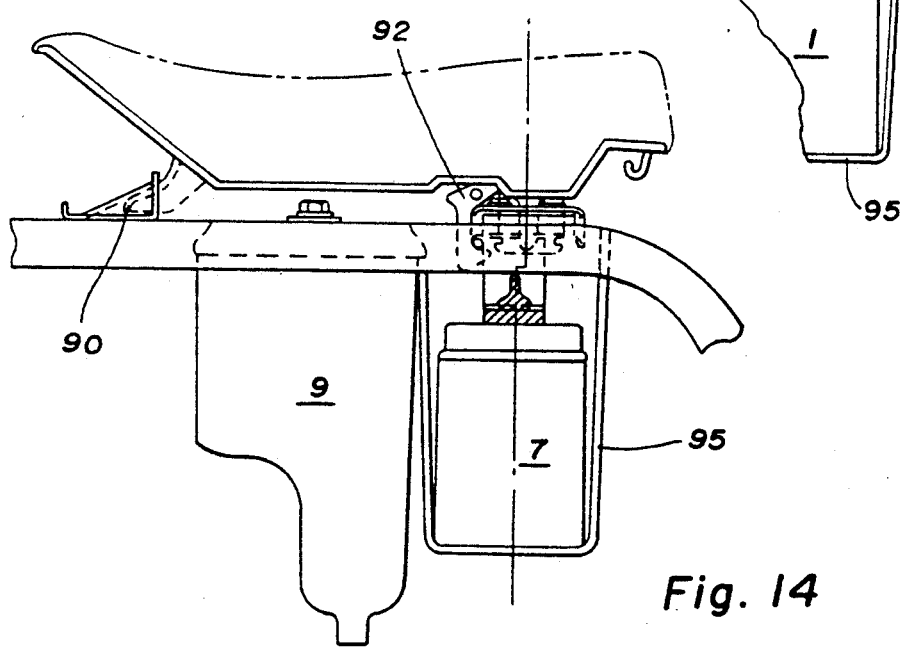

As shown in FIGS. 1 and 7, the storage receptacle 20 is connected for support to the rear parts 80', 81' of the frame 2 at connections 44. Further, the receptacle may be connected to the rear guard at connections 44', and if the optional subframe 60 is utilized, lateral side portions thereof will extend beneath the stepwise structure between the central and laterally extending portions 27, 29 of the storage receptacle and the laterally extending portion 29 will be secured to the subframe 60 at connections 49. An enlarged sectional view of an appropriate connection 44 is shown in FIG. 11. Particularly, a bottom wall 27' of the storage receptacle 20 is secured to a cross member 35 of the rear frame 34 through a nut and bolt type fastener. Additionally, a bushing 66 including a metallic portion 67 and an elastic portion 65 is provided between the bottom wall 27' of the storage receptacle and the bolt.

Inasmuch as the rear parts 80', 81' of the frame are positioned at a substantially lower level than the upper portions of the major part of the frame, the storage receptacle 20 is also positioned at a relatively low level. Such low positioning of the storage receptacle is desirable because it assures good riding stability even if heavy objects are stored therein, and because the storage receptacle can be made relatively large without substantially increasing the size of the vehicle 1 relative to conventional vehicles that do not have storage receptacles.

As best depicted in FIG. 1, the storage receptacle 20 is preferably located above the rear axle 28. Such location favorably increases the rigidity of the storage receptacle as disposed on the vehicle 1. Also, the bottom wall 27' of the storage receptacle is preferably inclined forwardly and has at least one drain hole 21 formed in a forward end thereof. Such forward inclination permits the bottom wall 27' to be disposed at a relatively low position without interfering with the vertical swinging movements of the rear axle 28, and also helps to prevent objects stored in the storage receptacle from moving around. The angle of inclination may be substantially larger than that depicted in the drawings, and the rear frame 34 will be inclined in a manner corresponding to the bottom wall 27' of the storage receptacle. Also, the drain holes 21 will preferably be provided with removable caps or plugs 25 which would be used to prevent water and the like from entering the storage receptacle through the drain holes 21 when the vehicle 1 is traveling over a wet terrain.

Figure 2:
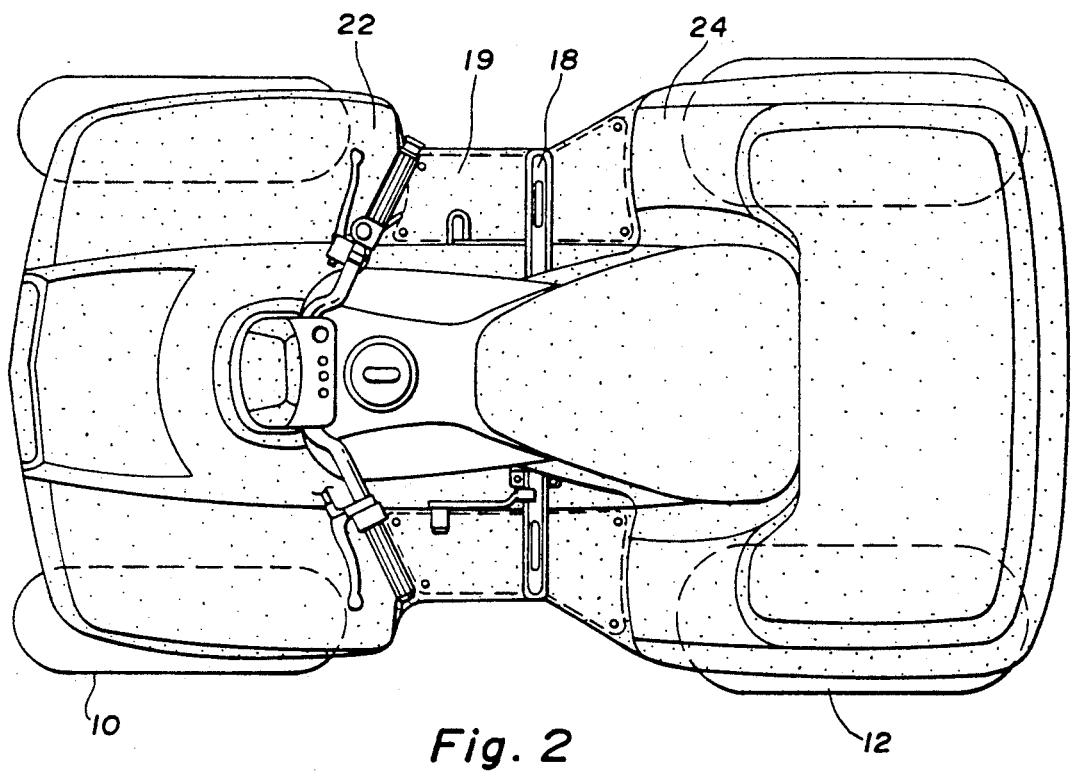
FIG. 2 is a plan view of the vehicle shown in FIG. 1.
Figure 4:
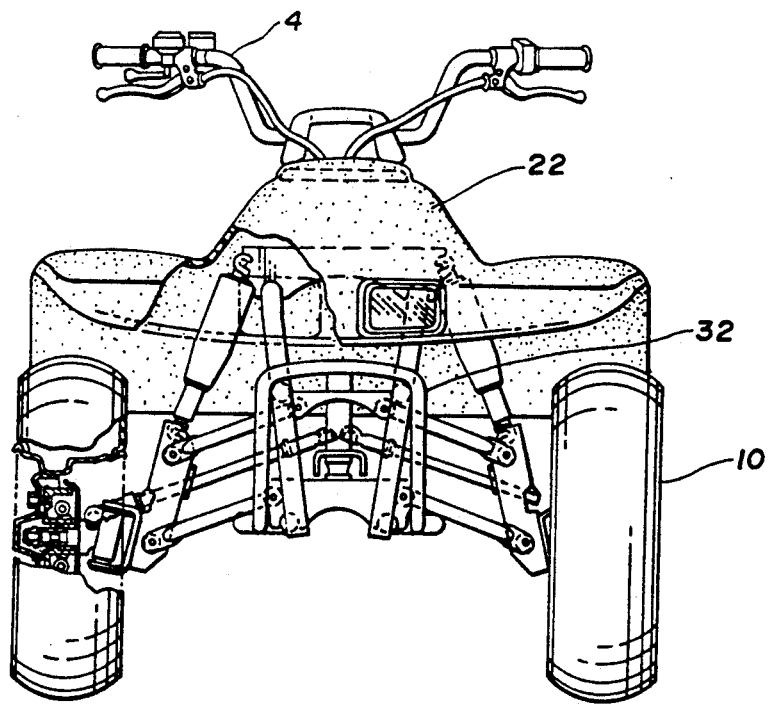
FIG. 4 is a front view, partly in section, of the vehicle shown in FIG. 1.

As shown in FIGS. 1 and 2, a pair of short panels 19 are preferably provided beneath the foot supports 18 for interconnecting front lower portions of the rear fender 24 to rear lower portions of the front fender 22. The short panels 19 enhance the strength and rigidity of the fenders 22, 24.

Figure 3:
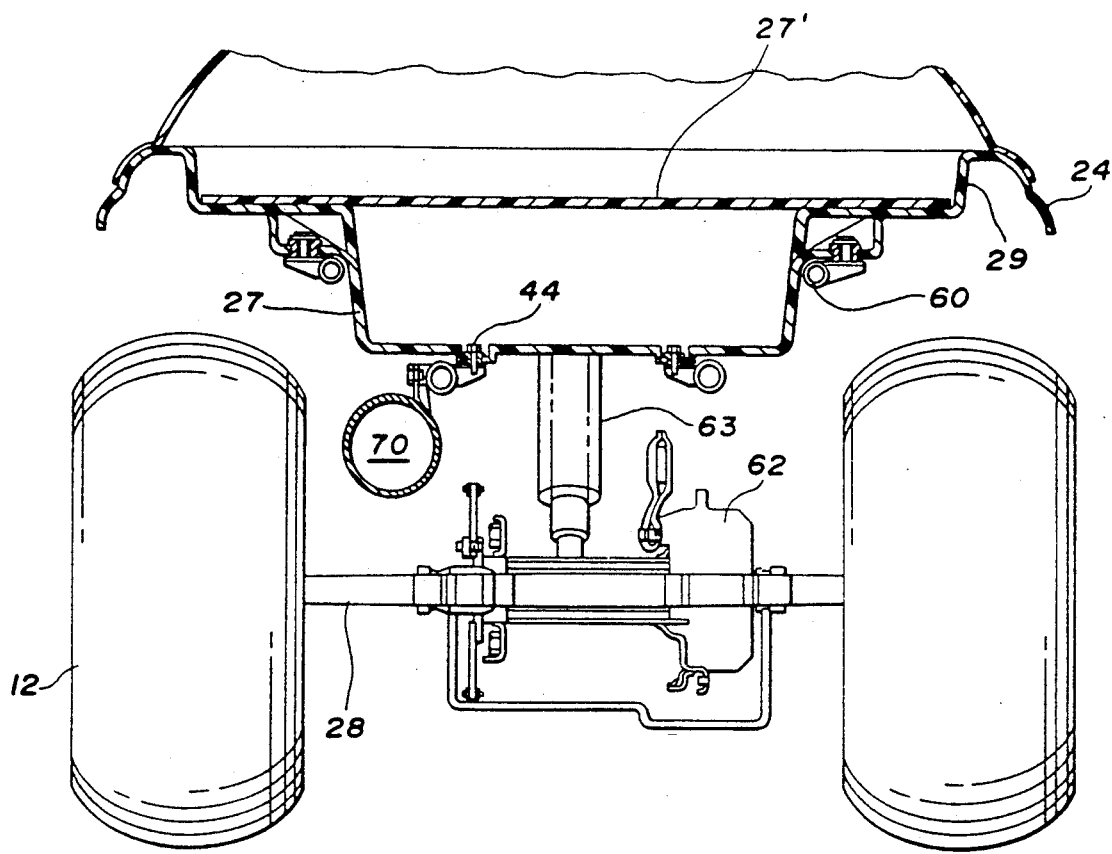
FIG. 3 is a rear view, partly in section, of the vehicle shown in FIG. 1.

Referring to FIGS. 1 and 3, a suspension means for the rear wheels 12 includes the rear swing arm assembly 14 and a cushioning unit 63. As depicted, the cushioning unit 63 is preferably of a conventional type including a hydraulic damper and a coil spring provided in surrounding relation to the hydraulic damper. A lower end of the cushioning unit is pivotally supported by a bracket extending forwardly from a central portion of the rear axle 28, while an upper portion of the cushioning unit is pivotally supported by another bracket 55 extending downwardly from a central portion of the cross member 56 interconnecting the laterally spaced sections 80, 81 of the frame 2. It will be noted in this regard that a substantial portion of the vehicle's rear suspension is disposed forwardly of the storage receptacle 20, even though the storage receptacle is positioned above the rear axle 28. This arrangement is very desirable because it permits the relatively large sized storage receptacle 20 to be optimally positioned above the vehicle's rear axle without interfering with the vehicle's rear suspension means, and without necessitating an increase in the overall size of the vehicle relative to conventional vehicles that do not include a large sized storage receptacle.

It will also be noted that the cross member 56 supporting the upper end of the cushioning unit 63 is positioned forwardly of the rear end of the major, loop shaped parts of the sections 80, 81.

Although not shown, the vehicle's rear suspension may be modified to include a pair of laterally spaced cushioning units, each having a lower end thereof pivotally connected to a bracket extending forwardly from the rear axle 28, and having an upper end thereof pivotally connected to a bracket extending downwardly from a corresponding one of the laterally spaced sections 80, 81 of the frame 2. Also, the rear suspension means could be modified by connecting the lower end of the cushioning unit 63 to the swing arm assembly 14 through a link arrangement so that the entire cushioning unit 63 would be positioned forwardly of the storage receptacle 20. Such a link arrangement would include a first link pivotally connected at a rear end thereof to a laterally extending member of the swing arm assembly 14 and a second link pivotally connected between a front end of the first link and a cross member extending between lower rear portions of the sections 80, 81. The lower end of the cushioning unit 63 would be pivotally connected to the pivoting connection between the first and second links and extend below the swing arm assembly 14. Again this modification is not shown in the drawings.

Vehicle 1 also includes a muffler 70 which, in the depicted embodiment, extends longitudinally of the vehicle at one side thereof. As depicted, the muffler 70 is preferably disposed below the bottom wall 27' of the storage receptacle 20 but substantially above the rear axle 28 so that it will not interfere with swinging, vertical movements of the rear axle. Also in this regard, the muffler is preferably positioned in offset relation to driven means for the rear axle 28, such as the depicted sprocket 30' driven by the drive chain 30, as well as to a braking mechanism 62 provided on the rear axle. Such offset relationship again ensures that the muffler 70 will not interfere with the driven means and the braking means when the rear axle is vertically moved, and also assures a better weight distribution or balancing of components at the rear end of the vehicle.

As discussed above, the transmission means of the vehicle's drive unit 16 could be replaced with other known drive means, such as a drive shaft type drive means. With such a drive means, a differential would replace the sprocket 30' on the rear axle 28. Such differential could be positioned laterally outwardly of the frame if so desired. Relatedly, the brake mechanism 62 on the axle could be replaced by a brake mechanism which cooperates directly with one or both of the rear wheels 12. Such modified drive means and brake means would have even less tendency to interfere with vertical swinging movements of the rear axle 28.

Referring to FIGS. 1 and 12-14, there is shown an arrangement whereby the battery 7 and air cleaner 9 are conveniently supported by the upper portion 80 of the frame 2 below the rider's seat 8. In the depicted arrangement, the rider's seat 8 is pivotally connected to upper portions of the sections 80, 81 such that it can be swung forwardly about a hinge means 90 at a front end thereof, and is securable in a riding position through a latch means 92 at a rear end thereof. The latch means 92 can be selectively released through any appropriate means such as the depicted handle 91. Once the seat 8 is swung forwardly, the battery 7 and air cleaner 9 are exposed for ready access thereto. As shown, the battery 7 is suspended through appropriate bracket means from a cross member 93 interconnecting the laterally spaced sections 80, 81 of the frame 2, while the air cleaner 9 is suspended from the sections through brackets 94. Note that the cross member 93 also supports the rider's seat 8. Note also that the battery 7 and air cleaner 9 are disposed longitudinally between a cylinder of the engine and an upper end of the cushioning unit 63. Such disposition efficiently utilizes space on the vehicle.

As depicted, the battery 7 is also preferably disposed in a small storage receptacle 95, which receptacle 95 is preferably formed integrally with the large storage receptacle 20 and the rear fender 24 as shown in FIGS. 1, 8 and 9.

Although there has been described what is at present considered to be the preferred embodiment of the invention, it will be understood that the invention can be embodied in other specific forms, and that many changes and modifications can be made to the above-described preferred embodiment without departing from the spirit or essential characteristics of the invention. The depicted embodiment is, therefore, to be considered in all aspects as merely illustrative, and not restrictive. The scope of the invention is indicated by the appended claims rather than the foregoing description.

We claim:

1. A vehicle comprising:
   a frame including a pair of laterally spaced sections, each section having upper, lower and rear portions;
   the upper and lower portions of each said frame section being joined together to form a closed loop when viewed from the side;
   an engine mounted to said frame;
   at least one front wheel;
   a pair of rear wheels disposed on opposite sides of said frame;
   a seat supported by said frame;
   the lower portion of each frame section including a first curved part extending rearwardly and upwardly behind the engine and a second curved part extending integrally rearwardly into the rear portion of the corresponding frame section, and the upper portion of the corresponding frame section extending rearwardly downwardly behind the seat and having a rear end part terminating at said second curved part of said lower portion;
   a swing arm supporting said rear wheels and connected to said frame;
   a rear axle connected to said rear wheels;
   a storage receptacle fixed to said rear portions of said frame sections, said receptacle having a bottom wall positioned above the rear portions of the frame sections and over said rear swing arm;
   suspension means for the rear axle disposed at least partially forwardly of the storage receptacle; and
   a connection between the suspension means and the upper portions of said frame sections being positioned forwardly of the downwardly extending rear end parts of said upper portions.

2. A vehicle according to claim 1, wherein:
   said rear end part of the upper portion of each said frame section terminates at the second curved part of the lower portion such that the upper and lower portions of the section define a substantially continuous curve when viewed from the side.

3. A vehicle according to claim 1, wherein:
   said rear and lower portions of each frame section are formed integrally as a unitary member.

4. A vehicle according to claim 1, wherein:
   said storage receptacle is positioned above the rear axle.

5. A vehicle according to claim 1, wherein:
   said vehicle further includes an air cleaner and a battery; and
   the battery and the air cleaner being disposed between a cylinder of the engine and the upper end of said suspension means.

6. A vehicle according to claim 1, including:
   front and rear fenders; and
   a connecting means connecting the front and rear fenders.

7. A vehicle according to claim 6, wherein:
   said vehicle further comprises a pair of foot supports provided on opposite sides of the frame; and
   said connecting means included a pair of panels disposed beneath the foot supports, respectively, and connecting lower rear portions of the front fender to lower front portions of the rear fender.

8. A vehicle according to claim 1, wherein:
   the vehicle further includes a battery disposed beneath the seat; and
   a battery support member is formed as an integral unit with a seat support member and connected to said frame.

9. A vehicle according to claim 1, wherein:
   said vehicle is a saddle type, off-road vehicle;
   said engine is supported at longitudinally central parts of the upper and lower portions of said frame sections; and
   said vehicle further includes a pair of longitudinally spaced reinforcing members interconnecting said longitudinally central parts of the upper and lower portions of each of said frame sections, and said engine being disposed between said reinforcing members.

10. A vehicle according to claim 1, wherein:
    said rear portion of each frame section extends rearwardly from a vertically intermediate portion of said closed loop.

* * * * *